United States Patent
Patil et al.

(10) Patent No.: US 10,445,196 B2
(45) Date of Patent: Oct. 15, 2019

(54) INTEGRATED APPLICATION ISSUE DETECTION AND CORRECTION CONTROL

(71) Applicant: Microsoft Technology Licensing, LLC, Redmond, WA (US)

(72) Inventors: Nagaraj Patil, Redmond, WA (US); Srihari Busam, Redmond, WA (US); Himanshu Misra, Bellevue, WA (US); Doru C. Nica, Sammamish, WA (US); Raghavendra Bhuthpur, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 15/400,071

(22) Filed: Jan. 6, 2017

(65) Prior Publication Data
US 2018/0196723 A1   Jul. 12, 2018

(51) Int. Cl.
G06F 11/00   (2006.01)
G06F 11/14   (2006.01)
G06F 11/07   (2006.01)

(52) U.S. Cl.
CPC ........ *G06F 11/1471* (2013.01); *G06F 11/079* (2013.01); *G06F 11/1433* (2013.01); *G06F 11/1438* (2013.01); *G06F 2201/805* (2013.01); *G06F 2201/82* (2013.01); *G06F 2201/84* (2013.01)

(58) Field of Classification Search
CPC ............................ G06F 11/1471; G06F 11/079
See application file for complete search history.

(56) References Cited

U.S. PATENT DOCUMENTS

| 5,590,277 | A | 12/1996 | Fuchs et al. | |
|---|---|---|---|---|
| 6,721,767 | B2* | 4/2004 | De Meno | G06F 11/1448 707/684 |
| 8,332,688 | B1* | 12/2012 | Tompkins | G06F 11/1438 714/13 |
| 9,294,494 | B1 | 3/2016 | Yin | |
| 9,542,430 | B1* | 1/2017 | Fitterer | G06F 17/30952 |
| 9,547,547 | B2* | 1/2017 | Heinz | G06F 11/0772 |
| 2004/0260678 | A1* | 12/2004 | Verbowski | G06F 11/008 |
| 2006/0167955 | A1* | 7/2006 | Vertes | G06F 11/3476 |
| 2007/0239728 | A1* | 10/2007 | Smits | G06F 11/1438 |
| 2009/0300416 | A1* | 12/2009 | Watanabe | G06F 11/1461 714/19 |

(Continued)

FOREIGN PATENT DOCUMENTS

| CN | 104933114 A | 9/2015 |
|---|---|---|
| CN | 105589791 A | 5/2016 |

OTHER PUBLICATIONS

"International Search Report & Written Opinion Issued in PCT Application No. PCT/US2018/012123", dated Jul. 11, 2018, 12 Pages.

(Continued)

*Primary Examiner* — Marc Duncan
*Assistant Examiner* — Jonathan D Gibson
(74) *Attorney, Agent, or Firm* — Christopher J. Volkmann; Kelly, Helt & Christenson, PLLC

(57) ABSTRACT

An issue is detected in the operation of a set of integrated applications. Assistive logic is launched and an application, causing the issue, is identified. Application running logic is controlled to roll the application back to a last known good state.

15 Claims, 10 Drawing Sheets

(56) References Cited

U.S. PATENT DOCUMENTS

| | | | | |
|---|---|---|---|---|
| 2012/0221884 | A1* | 8/2012 | Carter | G06F 11/0772 |
| | | | | 714/2 |
| 2013/0178195 | A1* | 7/2013 | Luna | H04W 24/04 |
| | | | | 455/414.1 |
| 2014/0109188 | A1 | 4/2014 | Pavlov et al. | |
| 2014/0130036 | A1* | 5/2014 | Gurikar | G06F 8/61 |
| | | | | 717/176 |
| 2014/0281676 | A1* | 9/2014 | Keshkamat | G06F 11/0709 |
| | | | | 714/5.11 |
| 2015/0347264 | A1 | 12/2015 | Mohammed et al. | |
| 2016/0154692 | A1* | 6/2016 | Heinz | G06F 11/0772 |
| | | | | 714/2 |
| 2017/0124141 | A1* | 5/2017 | Munir | G06F 17/30377 |
| 2017/0242773 | A1* | 8/2017 | Cirne | G06F 11/0706 |

OTHER PUBLICATIONS

Wells, Joyce, "Oracle Introduces Next-Generation Monitoring and Analytics Solution—Oracle Management Cloud", http://www.dbta.com/Editorial/News-Flashes/Oracle-Introduces-Next-Generation-Monitoring-and-Analytics-Solution-Oracle-Management-Cloud-107188.aspx, Published on: Oct. 27, 2015, 2 pages.

Hussain, Sadequl, "Sending Amazon CloudWatch Logs to Loggly with AWS Lambda", https://www.loggly.com/blog/sending-aws-cloudwatch-logs-to-loggly-with-aws-lambda/, Published on: Apr. 7, 2016, 26 pages.

Leff, et al., "Integrator: An Architecture for an Integrated Cloud/On-Premise Data-Service", In Proceedings of IEEE International Conference on Web Services, Jun. 27, 2015, 2 pages.

"Integrating your On-Premise Applications with Cloud Applications", https://web.archive.org/web/20130423100154/http://www.oracle.com/technetwork/topics/cloud/whatsnew/integrating-on-premise-apps-cloud-300329.pdf, Published on: Apr. 23, 2013, pp. 1-36.

Fagan, et al., "Leveraging Cloud Infrastructure for Troubleshooting Edge Computing Systems", In Proceedings of IEEE 18th International Conference on Parallel and Distributed Systems, Dec. 17, 2012, 2 pages.

Yu, et al., "Mass log data processing and mining based on Hadoop and cloud computing", In Proceedings of 7th International Conference on Computer Science & Education, Jul. 14, 2012, 2 pages.

Meera, et al., "Event Correlation for Log Analysis in the Cloud", In Proceedings of IEEE 6th International Conference on Advanced Computing, Feb. 27, 2016, 2 pages.

Lin, et al., "Secure logging framework integrating with cloud database", In Proceedings of International Carnahan Conference on Security Technology, Sep. 21, 2015, 2 pages.

* cited by examiner

INTEGRATED APPLICATION ISSUE DETECTION AND CORRECTION CONTROL

BACKGROUND

Computing systems are currently in wide use. Some such computing systems are systems which integrate a plurality of different applications. For instance, one such computing system is a productivity service computing system that integrates a plurality of different productivity applications (such as a word processing application, a spreadsheet application, a slide presentation application, etc.) and allows users to subscribe to one or more of the integrated applications. The computing system can also host integrated services such as document management services, social network services, electronic mail (email) services, among others.

By integrated, in one example, it is meant that the applications or services can be managed and configured through a portal so users can be added through the portal. Also, in one example, with integrated applications, each user can have a single sign-on to obtain access to all of the applications. In addition, updates or upgrades to the integrated applications are released, on a periodic basis.

When a user subscribes to one or more of the applications, the user may install a client component corresponding to the productivity service, that provides the user with access to the one or more applications or services that the user has subscribed to, on the productivity service computing system.

In such computing systems, it is not uncommon for the productivity service computing system to roll out additional code or modifications to the existing code. For instance, the productivity service computing system may roll out an upgraded version, bug fixes to an existing version, or a wide variety of other modifications or changes to the integrated productivity applications and services.

It may be that a user who is using one or more of the applications or services that he or she has subscribed to may encounter an issue which is a problem that degrades or inhibits operation of one or more of the applications or services. Because the applications are integrated, it can be difficult for the user to identify which particular application or service is causing the issue. For instance, upgrades or revisions to one application or service may cause an issue in another integrated application or service.

The discussion above is merely provided for general background information and is not intended to be used as an aid in determining the scope of the claimed subject matter.

SUMMARY

An issue is detected in the operation of a set of integrated applications. Assistive logic is launched and an application, causing the issue, is identified. Application running logic is controlled to roll the application back to a last known good state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
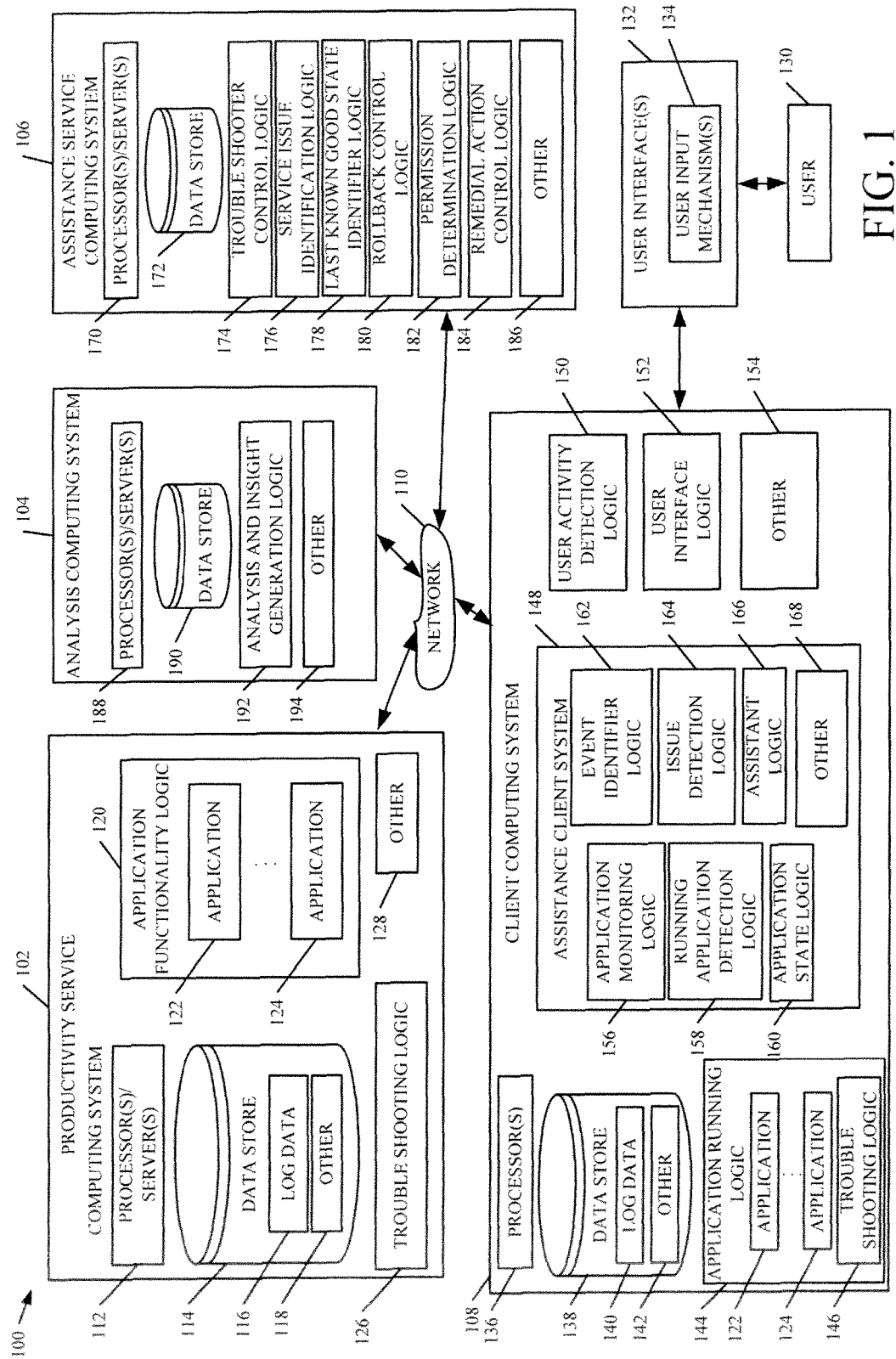
FIG. 1 is a block diagram of one example of a computing system architecture.

FIG. 1 is a block diagram showing one example of a computing system architecture 100. Architecture 100 illustratively includes productivity service computing system 102, analysis computing system 104, assistance service computing system 106, and one or more client computing systems 108. Systems 102-108 are illustratively in communication with one another over a network 110. Network 110 can be a wide variety of different types of networks, such as a wide area network, a local area network, a cellular network, among a wide variety of others.

In the example shown in FIG. 1, productivity service computing system 102 illustratively includes one or more processors or servers 112, data store 114 (which stores log data 116 and can store a wide variety of other data 118), application functionality logic 120 (which can run a plurality of different, integrated, productivity applications 122-124), troubleshooting logic 126, and it can include other items 128. Productivity service computing system 102 illustratively allows users (such as user 130) to access and run one or more productivity applications 122-124. In doing so, client computing system 108 illustratively generates one or more user interfaces 132, with user input mechanisms 134, for interaction by user 130. User 130 can interact with user input mechanisms 134 in order to control and manipulate client computing system 108, and ultimately to control and manipulate productivity service computing system 102. Thus, for instance, user 130 can interact with user input mechanisms 134 to subscribe to one or more applications 122-124 on service computing system 102. This gives user 102 access to the functionality of those applications so that user 130 can access those applications.

In one example, the applications 122-124 are productivity applications, such as a word processing application, a spreadsheet application, a slide presentation application, etc. It will be noted, however, that productivity service computing system 102 can also provide user 130 with the ability to subscribe to, and access, hosted services. Such services can include file sharing and management services, social network services, electronic mail or other communication services, among others.

Client computing system 108, in the example shown in FIG. 1, includes one or more processors or servers 136, data store 138 (that can store log data 140 with log entries, and other items 142), application running logic 144 that can run one or more applications 122-124, which the user has subscribed to or otherwise gained access to at productivity service computing system 102, and it can include troubleshooting logic 146 as well. Client computing system 108 can also include assistance client system 148, user activity detection logic 150, user interface logic 152, and it can include other items 154. Assistance client system 148, itself, can include application monitoring logic 156, running application detection logic 158, application state logic 160, event identifier logic 162, issue detection logic 164, assistant logic 166, and other items 168. Before describing architecture in more detail, a brief description of some of the items in architecture 100 and their operation will first be provided Application running logic 144 can run client components of applications 122-124, or it can interact with application functionality logic 120 to run applications 122-124 on productivity service computing system 102. Troubleshooting logic 146 can be launched to troubleshoot all of the applications 122-124, collectively, or to specifically troubleshoot a given application 122-124.

Log data 140 illustratively has log entries that log events that occur while running applications 122-124. The events can take a wide variety of different forms and illustratively represent the tasks, actions, steps, notifications, and other activity taken by application running logic 144 in running the applications. It also illustratively detects user actions taken while running those applications. The events can represent a wide variety of other things as well.

Assistant client system 148 illustratively runs in the background while application running logic 144 is running applications 122-124. Application monitoring logic 156 illustratively monitors the running applications for events and stores those events in log data 140. Running application detection logic 158 maintains an indication in the log data as to which applications 122-124 are currently running. Application state logic 160 illustratively maintains a state of those running applications (which is described in greater detail below) and event identifier logic 162 identifies the particular events that are logged in log data 140.

Issue detection logic 164 illustratively detects when an issue is occurring in one more of the applications 122-124, based upon the particular events identified by event identifier logic 160. When an issue has occurred, assistant logic 166 is launched. Logic 166 is described in greater detail below with respect to FIG. 1. Briefly, however, it aggregates log data 140 and sends it to assistance service computing system 106. It also performs troubleshooting to identify a particular application 122-124, that is running on client computing system 108, and that caused or resulted in the issue. It then determines whether the issue came about because of a state change in the identified application (such as because the application was upgraded, updated, or otherwise modified). If so, it rolls the state of the application back to its last known good state and reports the issue and roll back to both analysis computing system 104 and assistance service computing system 106. If the error did not occur because of a state change, then assistance logic 166 obtains instructions from either troubleshooting logic 146 or from assistance service computing system 106 indicating steps that can be taken in order to remedy the issue.

User activity detection logic 150 illustratively detects user activity to determine which particular application 122-124 the user was active in, when the issue occurred. User interface logic 152 illustratively generates user interfaces 132 and detects user interaction with those interfaces.

Assistance service computing system 106 can, when it receives a notification that an issue has occurred on client computing system 106, perform checks on productivity service computing system 102 to determine whether the issue originated at the service level. If so, it can also roll back the service to its last known good state.

Thus, in the example shown in FIG. 1, assistance service computing system 106 illustratively includes one or more processors or servers 170, data store 172, troubleshooter control logic 174, service issue identification logic 176, last known good state identifier logic 178, roll back control logic 180, permission determination logic 182, remedial action control logic 184, and it can include other items 186. Troubleshooter control logic 174 can, in response to receiving notice of an issue, launch troubleshooting logic 126 so that it can troubleshoot productivity service computing system 102. Service issue identification logic 176 can access log data 116 and the data generated by troubleshooting logic 126, to determine whether the issue originated in the productivity service computing system 102, as opposed to on client computing system 108. If so, last known good state identifier logic 178 illustratively identifies the last known good state for the service and roll back control logic 180 controls the application functionality logic 120 to roll the service back to its last know good state (e.g., to its last known good build).

If the issue did not originate on productivity service computing system 102, then permission determination logic 182 determines whether permission is needed from user 130 or client computing system 108 in order to take actions to remedy the issue on client computing system 108. If not, remedial action control logic 104 illustratively and automatically takes actions on client computing system 108 in order to remedy the issue. It can also provide a notification to client computing system 108 of the particular steps that were taken. However, if it is determined that permission is needed from client computing system 108 or user 130 in order to take the steps that will remedy the action, then remedial action control logic 184 illustratively generates an indication of the particular steps or actions that are needed in order to remedy the issue and provides them to client computing system 108. Assistant logic 166 can use user interface logic 152 to surface those steps or actions for user 130, for an administrative user, or otherwise.

Analysis computing system 104 illustratively includes processors or servers 188, data store 190, analysis and insight generation logic 192, and it can include other items 194. Data store 190 can store a wide variety of information, such as information indicative of the various issues or problems that are encountered in architecture 100. Analysis and insight generation logic 192 can perform analysis on that data and surface the analysis results to the users or architecture 100, to an engineering or manufacturing team in architecture 100, to administrative users, or in a wide variety of other ways.

Figure 2:
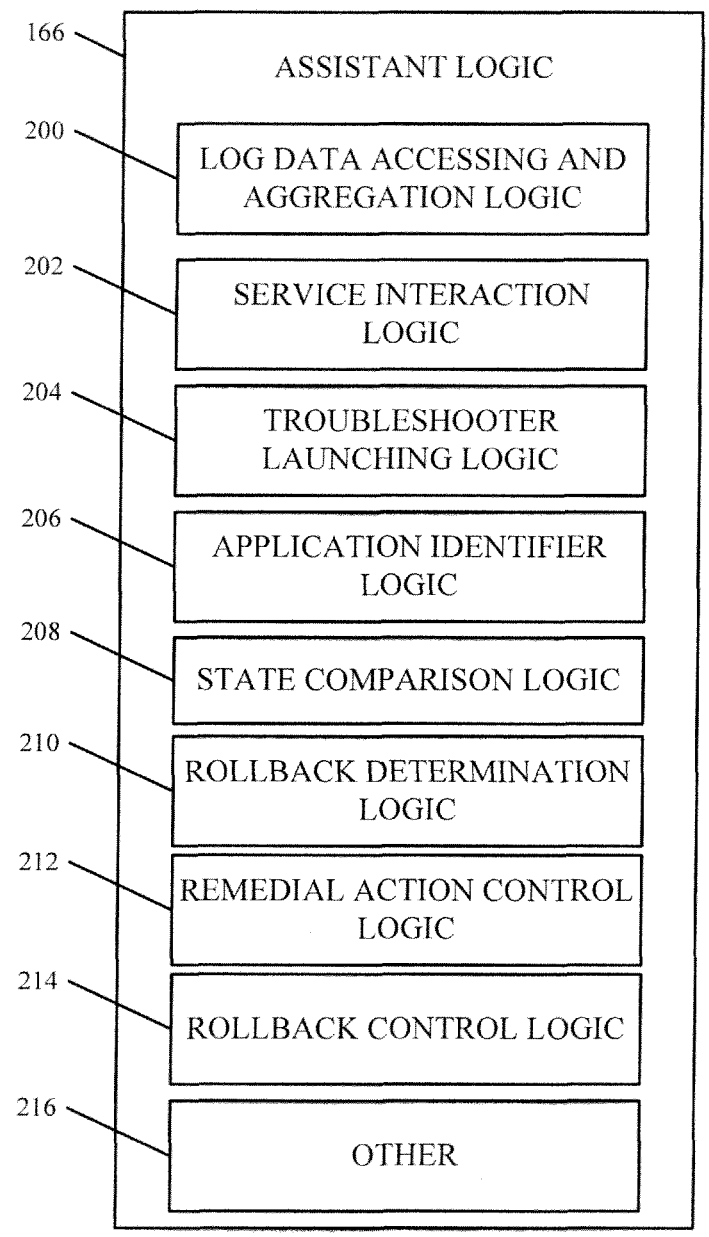
FIG. 2 is a block diagram showing one example of assistant logic in more detail.

FIG. 2 is a block diagram showing one example of assistant logic 166 in more detail. In the example shown in FIG. 2, assistant logic 166 illustratively includes log data accessing and aggregation logic 200, service interaction logic 202, troubleshooter launching logic 204, application identifier logic 206, state comparison logic 208, roll back determination logic 210, remedial action control logic 212, roll back control logic 214, and it can include other items 216. By way of overview, when issue detection logic 164 (shown in FIG. 1) detects an issue on client computing system 108, then log data accessing and aggregation logic 200 illustratively accesses the log data 140 and aggregates the log data that identifies events taken during a relevant time period (such as a time period that extends from before the issue was detected to after the issue was detected). That data is aggregated and illustratively sent to assistance service computing system 106 by service interaction logic 202. The data can include a request to assistance service computing system 106 to perform checks on productivity service computing system 102 to determine whether any issues are occurring on system 102.

Troubleshooter launching logic 204 illustratively launches troubleshooting logic 146 to troubleshoot the application running logic 144 or the applications 122-124 that it is running. Application identifier logic 206 identifies, based upon the log data and based upon information generated by troubleshooter logic, which particular application 122-124 has caused the issue. State comparison logic 208 illustratively compares a current state of the application to a last know good state which is a state of the application that existed before the issue was detected. If the issue was detected shortly after a change of state (such as shortly after an upgrade, update, etc.) then this may indicate that the issue was caused by the state change. Roll back determination logic 210 makes this determination, and if it was indeed caused by the state change, then roll back control logic 214 generates control signals to restore the application by rolling it back to its last known good state. For instance, it may roll it back to the state it was in prior to the most recent update, upgrade, etc.

If it is determined that the issue was not caused by the state change, then remedial action control logic 212 illustratively identifies remedial action that can be taken in order to address the issue. This may be based on information generated by troubleshooting logic 146 or by information provided by assistance service computing system 106. This is described in greater detail below.

Figure 3A:
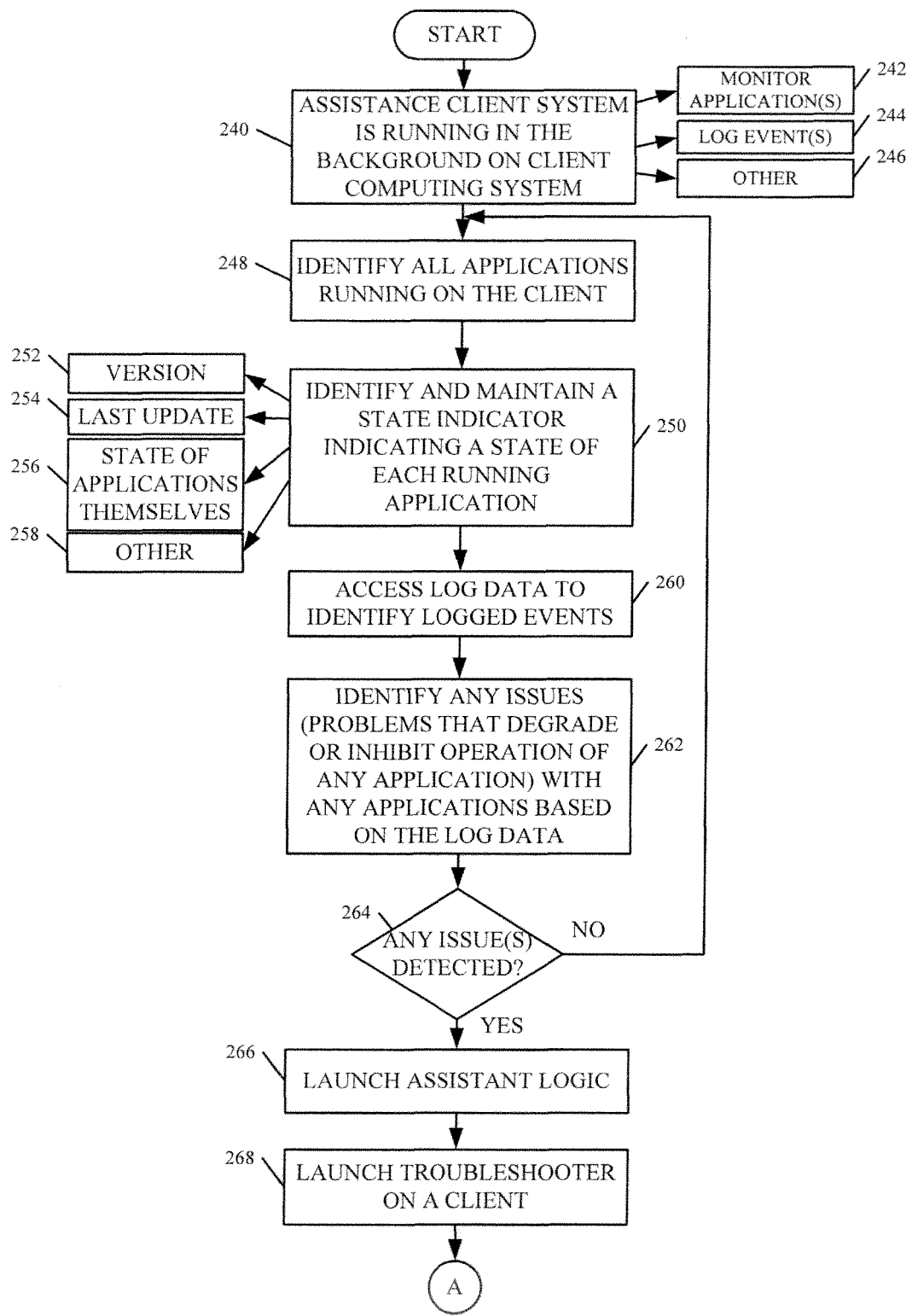
FIGS. 3A and 3B (collectively referred to herein as FIG. 3) illustrate one example of the operation of the architecture shown in FIG. 1 in identifying an issue and taking remedial action on a client computing system.
Figure 3B:
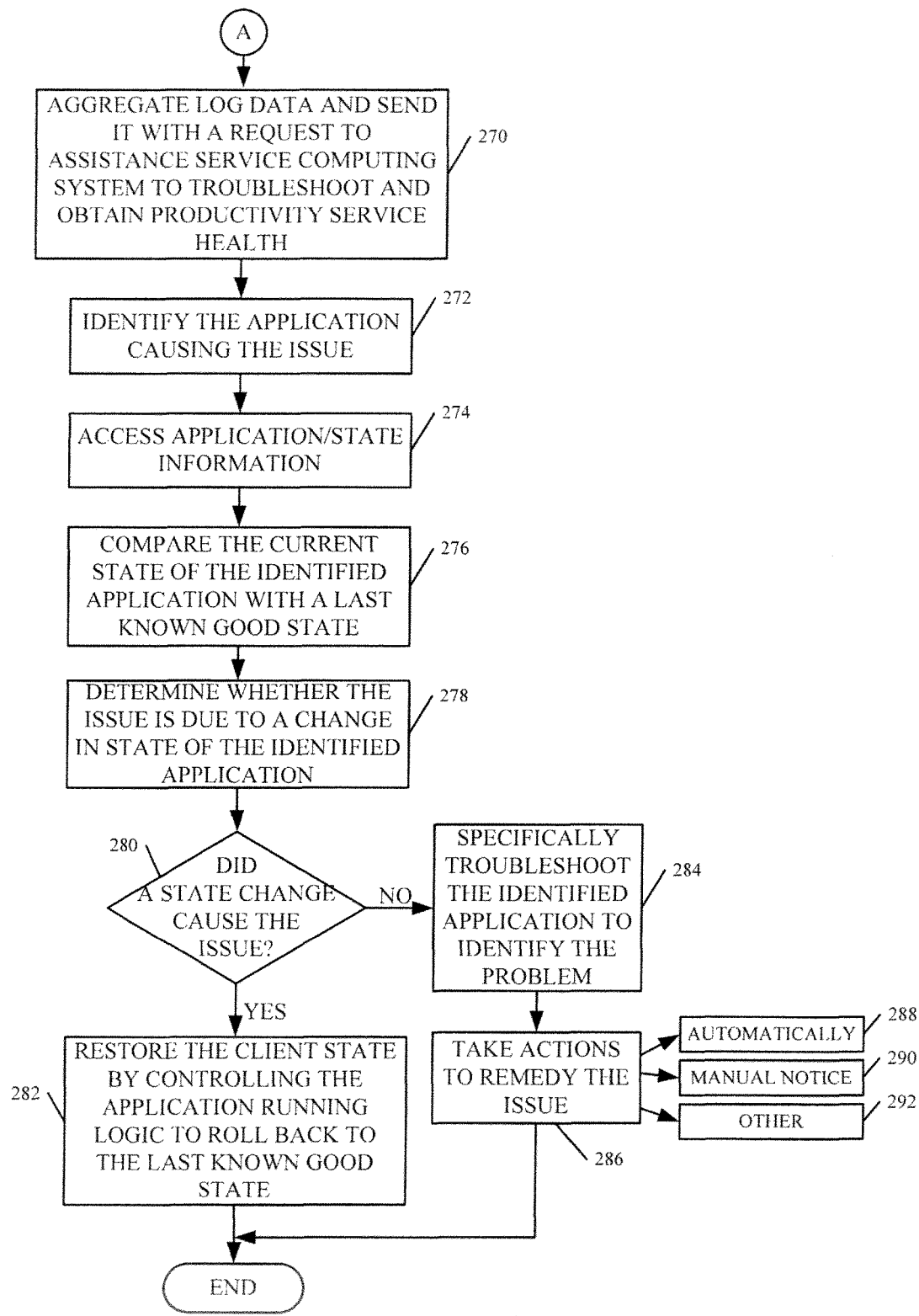

FIGS. 3A and 3B (collectively referred to herein as FIG. 3) show a flow diagram illustrating one example of the operation of architecture 100, and assistant logic 166, shown in FIGS. 1 and 2. FIGS. 1-3 will now be described in conjunction with one another.

It is first assumed that assistant client system 148 is running in the background on client computing system 108. This is indicated by block 240 in the flow diagram of FIG. 3. Application monitoring logic 156 illustratively monitors the running applications and logs entries representing events in log data 140, that are generated by the applications, by application running logic 144, by user activity of user 130, or other events. Monitoring the applications is indicated by block 242 and logging events is indicated by block 244. Assistant client system 148 can be running in the background in other ways and performing other actions as well, and this is indicated by block 246.

Running application detection logic 258 illustratively keeps a record of which particular applications 122-124 are currently running on client computing system 108. Identifying these running applications is indicated by block 248 in the flow diagram of FIG. 3.

Application state logic 160 illustratively maintains a state indicator, for each running application, indicating the state of the application. This is indicated by block 250. The state can include a wide variety of different information, such as the version 252 of the application, a last update identifier 254 that identifies a last update that was made to the application, the state of the application itself, such as the particular user interfaces being generated, the state of the controls on any given user interface, or a wide variety of other state information. Maintaining the state of the running applications themselves is indicated by block 256. The state indicator indicating the state of each running application can include a wide variety of other items as well, and this is indicated by block 258.

Event identifier logic 162 illustratively accesses the log data 140, where the events are logged to identify any particular events that have been logged. Accessing the log data to identify logged events is indicated by block 260. It may be that the events, themselves, or the sequence of the events, or the timing of the events, may indicate that an issue is present that may degrade or inhibit the operation of one or more applications 122-124 or services. Thus, issue detection logic 164 illustratively identifies any issues with any applications, based upon the log data. This is indicated by block 262.

An example may be helpful. It may be, for instance, that user 130 has authored an e-mail message in an e-mail service, and has attached a word processing document as an attachment to the e-mail. The user may then actuate the send actuator but, for some reason, the e-mail message, with the attachment, is never sent but stays in the user's outbox. Given this sequence, it may be that the user 130 knows that an issue exists, but does not know what is causing the issue. For instance, it may be that the word processing application is not communicating properly with the electronic mail service. It may also be that the word processing application is operating correctly, but that the issue is in the electronic mail service. It will also be noted that, in one example, events corresponding to each of the actions discussed above will be logged. Therefore, the user action of attaching a document will be logged. The user action of authoring an e-mail message will be logged, and the user interacting with the send actuator in the e-mail user interface will be logged indicating that the user desires to send the e-mail message, with the attachment. In addition, the action of placing the e-mail message in the outbox for the user will also be logged. However, after a certain amount of time, if there is no event indicating that the message was ever sent, or indicating that it is still in the user's outbox, then this may be detected by issue detection logic 164 as being indicative of an issue.

If no issues are detected, as indicated by block 264 in the flow diagram of FIG. 3, then processing reverts to block 248 where the identity of the state of the running applications is maintained. Assistance client system 148 continues to run in the background, logging events, etc.

However, if, at block 264, an issue is detected, then issue detection logic 164 launches assistant logic 166. This is indicated by block 266. Troubleshooter launching logic 204 in assistant logic 166 then launches troubleshooting logic 146 in application running logic 144, to troubleshoot application running logic 144. Log data accessing and aggregation logic 200 aggregates the log data 140, relevant to the detected issue, and sends it, along with a request (to assistance service computing logic 106) to troubleshoot and obtain productivity service health information indicative of the health of productivity service computing system 102. Launching the troubleshooter on the client is indicated by block 268 in the flow diagram of FIG. 3 and aggregating and sending the log data, along with a request to troubleshoot productivity service computing system 102, is indicated by block 270.

Application identifier logic 206 then identifies the particular application that is causing the issue, if the issue is being caused on client computing system 108, as opposed to on service computing system 102. Identifying the client application is indicated by block 272 in the flow diagram of FIG. 3. This can be done based on the information generated by troubleshooting logic 146, or based on the event information identified from log data 140. It can also be done based on the information generated by user activity detection logic 150, that identifies which application user 130 was active at the time the issue arose. It can of course be identified in other ways as well.

Once the application causing the issue has been identified, then state comparison logic 208 compares a current state indicator, indicating a current state of that application, to a last known good state indicator indicating a state of the application when it was last run, without the issue. Accessing the application state information and comparing the current state of the identified application with a last known good state is indicated by blocks 274 and 276 in the flow diagram of FIG. 3.

Roll back determination logic 210 then determines whether the issue was likely caused by the change in state. For instance, if the last known good state is different from the current state, then it may well be that the change in state caused the issue to occur. Therefore, based on this determination, the roll back determination logic 210 may determine that a state change caused the issue. If, however, the last known good state is the same as the current state, then it will be determined that a state change did not cause the issue. Determining whether the issue is due to a change in state of the identified application is indicated by block 278.

If, as indicated by block 280, it is determined that the state change did cause the issue, then roll back control logic 214 illustratively restores the client state by controlling the application running logic 144 to roll back to the last known good state of the application. This is indicated by block 282. For instance, if the last known good state was a prior version of the application, then roll back control logic 214 controls application running logic 144 to load and run the prior version of the application, instead of the updated or upgraded version. If the prior state of the application was a state prior to applying a bug fix or an update, then the application running logic 144 is controlled to roll the application back to the state of the application before the bug fix or upgrade was applied, and to use the application in that previous state.

If, at block 280, it is determined that a state change did not cause the issue, then troubleshooter launching logic 204 launches specific troubleshooting logic 146 for the identified application, to specifically troubleshoot that application. This is indicated by block 284 in the flow diagram of FIG. 3. Remedial action control logic 212 can then take action to remedy the issue. This is indicated by block 286. The action can take a wide variety of different forms. For instance, remedial action control logic 212 can control the application running logic 144 to automatically take action to remedy the issue. This is indicated by block 288. By automatically, it is meant that the actions are taken without any further user involvement expect, perhaps, to initiate or authorize the actions. It can also generate a notice indicative of the remedial actions that should be taken, and surface that notice to user 180 (or an administrator) so the user 130 (or administrator) can manually take those actions. This is indicated by block 290. The remedial actions can be taken in other ways as well, and this is indicated by block 292.

Figure 4:
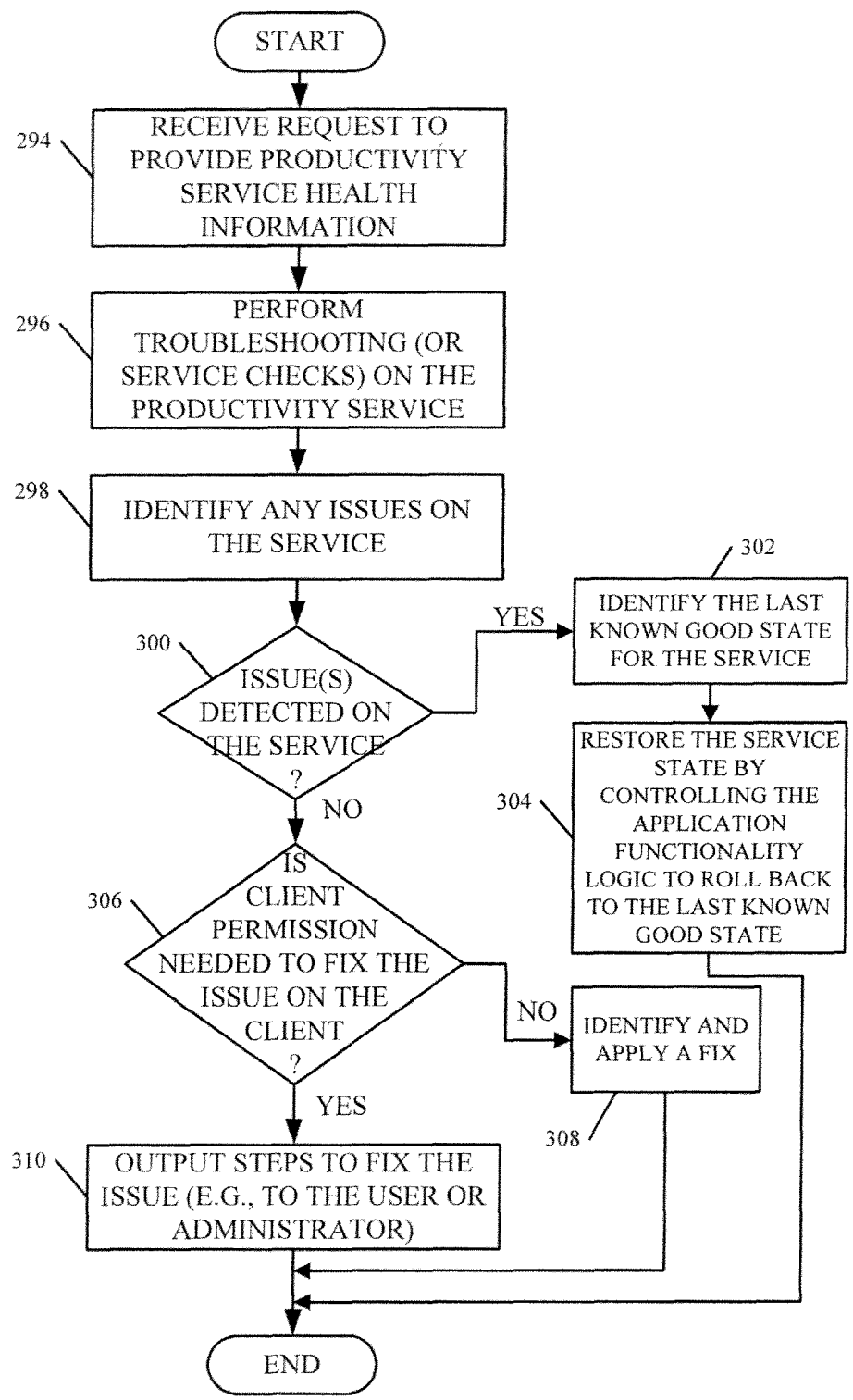
FIG. 4 is a flow diagram illustrating one example of the operation of the architecture illustrated in FIG. 1 in identifying an issue and taking remedial action on a server side of the architecture.

FIG. 4 is a flow diagram illustrating one example of the operation of architecture 100 in using assistance service computing system 106, once an issue has been detected by assistance client system 148. Troubleshooter control logic 174 first receives the request to provide productivity service health information corresponding to productivity service computing system 102. This is indicated by block 294 in the flow diagram of FIG. 4. Troubleshooter control logic 174 then performs troubleshooting on productivity service computing system 102 to identify whether there are any issues originating from the service computing system 102. In doing so, it can perform troubleshooting remotely, or it can launch troubleshooting logic 126 on productivity service computing system 102. It receives the troubleshooting results generated by troubleshooting logic 126. Performing troubleshooting on the productivity service is indicated by block 296 in the flow diagram of FIG. 4.

Service issue identification logic 176 illustratively receives the troubleshooting information, along with the aggregated log information that it received from client computing system 108. It can also access log data 116 to determine whether an issue is present on productivity service computing system 102. Identifying issues on the service is indicated by block 298 in the flow diagram of FIG. 4.

If an issue is detected on the service 102, then last known good state identifier logic 178 accesses log data 116 to identify the last known good state of the service and roll back control logic 180 controls application functionality logic 120 to roll back to the last known good state. This is indicated by blocks 300, 302, and 304 in the flow diagram of FIG. 4.

If, at block 300, no issue is detected on the service computing system 102, then permission determination logic 182 determines whether client permission is needed before automatically fixing the issue on client computing system 108. This is indicated by block 306. This may be determined in a wide variety of different ways. For instance, it may be that a mapping is maintained between various issues and whether permission is needed, or whether those issues can be manually remedied. It may be that certain configuration settings are made to configure the system to indicate that permission is needed to remedy certain issues but not other issues. These settings can be made dynamically or statically. They can be user modifiable or modifiable by an administrator, or the determination as to whether permission is needed to remedy the issue can be made in a wide variety of other ways.

If it is determined that permission is not needed, then remedial action control logic 184 identifies the remedial steps or actions that need to be taken in order to remedy the issue on client computing system 108, and generates control signals to control the various parts of client computing system 108 in order to take the remedial action. Identifying and applying a fix to remedy the issue in this way is indicated by block 308. The fix may be identified based on the troubleshooting information, it may be identified based on the particular issue that is identified, or it may be identified in other ways as well.

If, at block 306, it is determined that client permission is needed to fix the issue on the client computing system 108, then remedial action control logic 184 illustratively generates a representation of the remedial actions that are to be taken in order to fix the issue, and provides that representation to client computing system 108, where it can be surfaced for implementation by user 130, by an administrative user, or otherwise. Outputting the steps to fix the issue in this way is indicated by block 310 in the flow diagram of FIG. 4.

It can thus be seen that, even using integrated applications, the present description enables identifying which of the integrated applications is causing an issue, and whether the issue is being caused locally on a client computing system or at the service level in the service computing system. It also automatically detects whether the issue was likely caused by a change of state of the application or the service and, if so, it rolls the application or service back to its last known good state. This significantly enhances the accuracy and operation of the integrated applications of the hosted services, and of the computing system as a whole.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
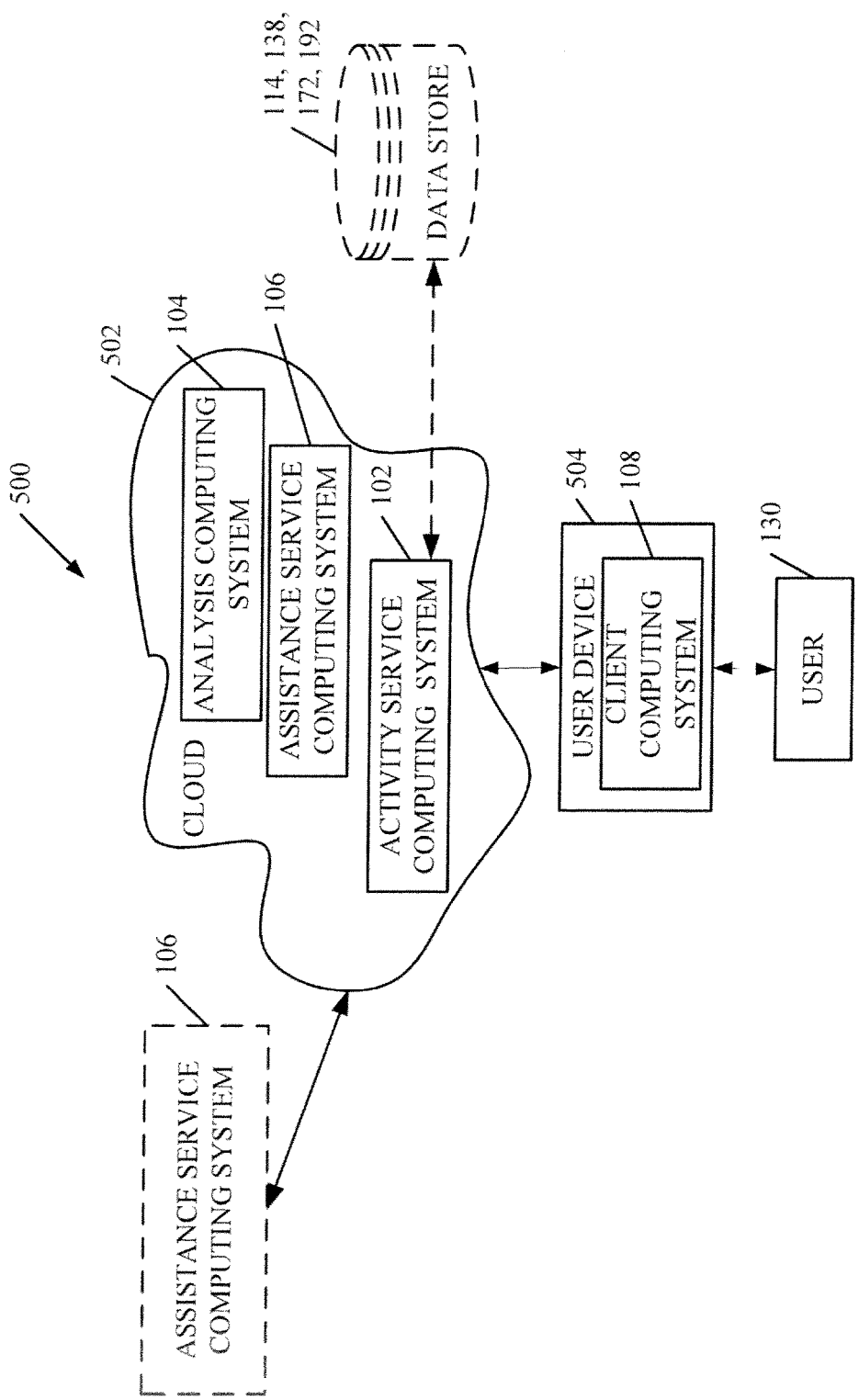
FIG. 5 is a block diagram showing the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 102, 104 and 106 can be located in cloud 502 (which can be public, private, or a combination where portions are public while others are private). Therefore, user 130 uses a user device 504 that includes client computing system 108 to access those systems through cloud 502.

FIG. 5 also depicts another example of a cloud architecture. FIG. 5 shows that it is also contemplated that some elements of architecture 100 can be disposed in cloud 502 while others are not. By way of example, data stores 114, 138, 172 and/or 192 can be disposed outside of cloud 502, and accessed through cloud 502. In another example, system 106 (or other systems) can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
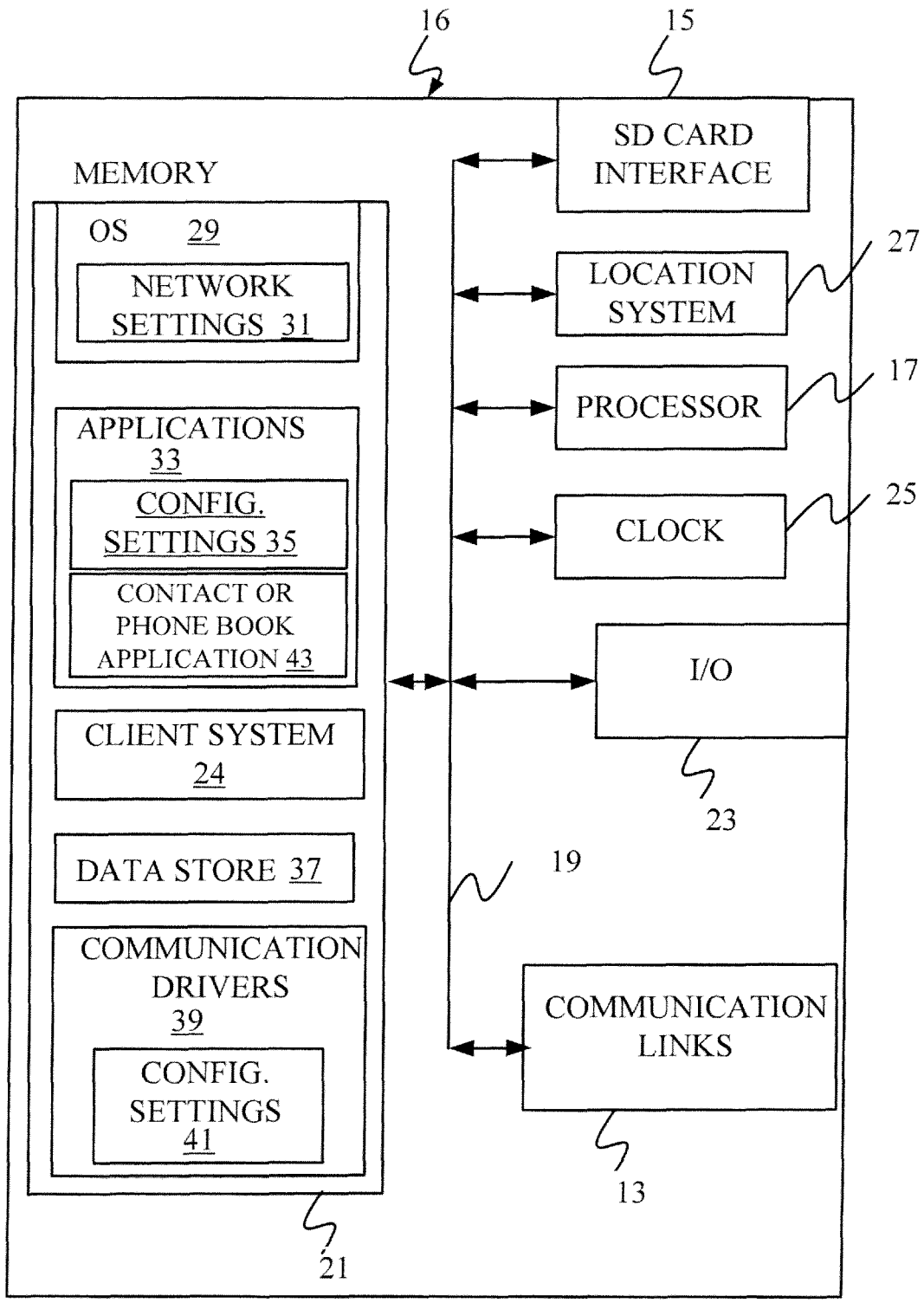
FIGS. 6-8 show examples of mobile devices that can be used in the architectures illustrated in the previous figures.
Figure 7:
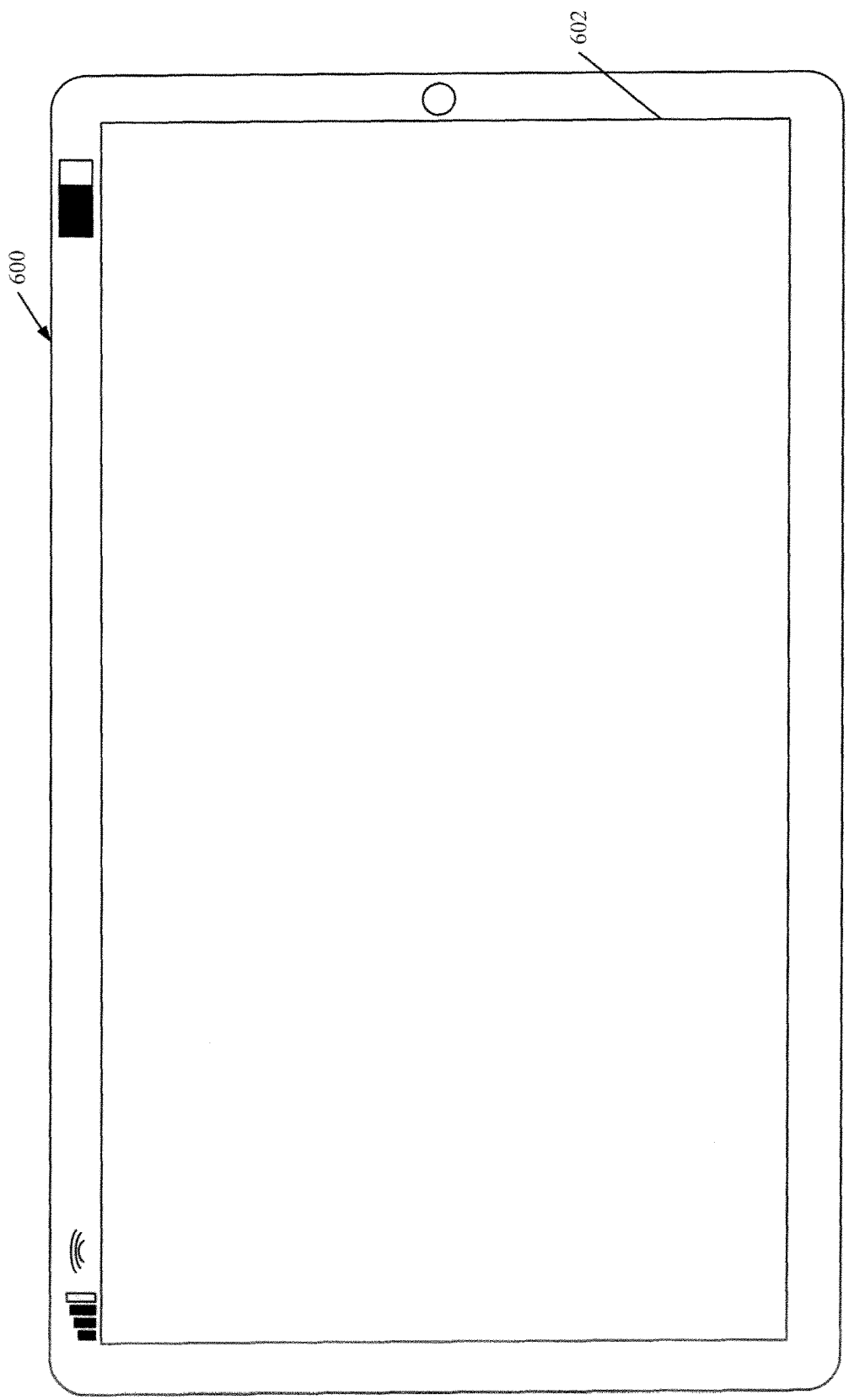
Figure 8:
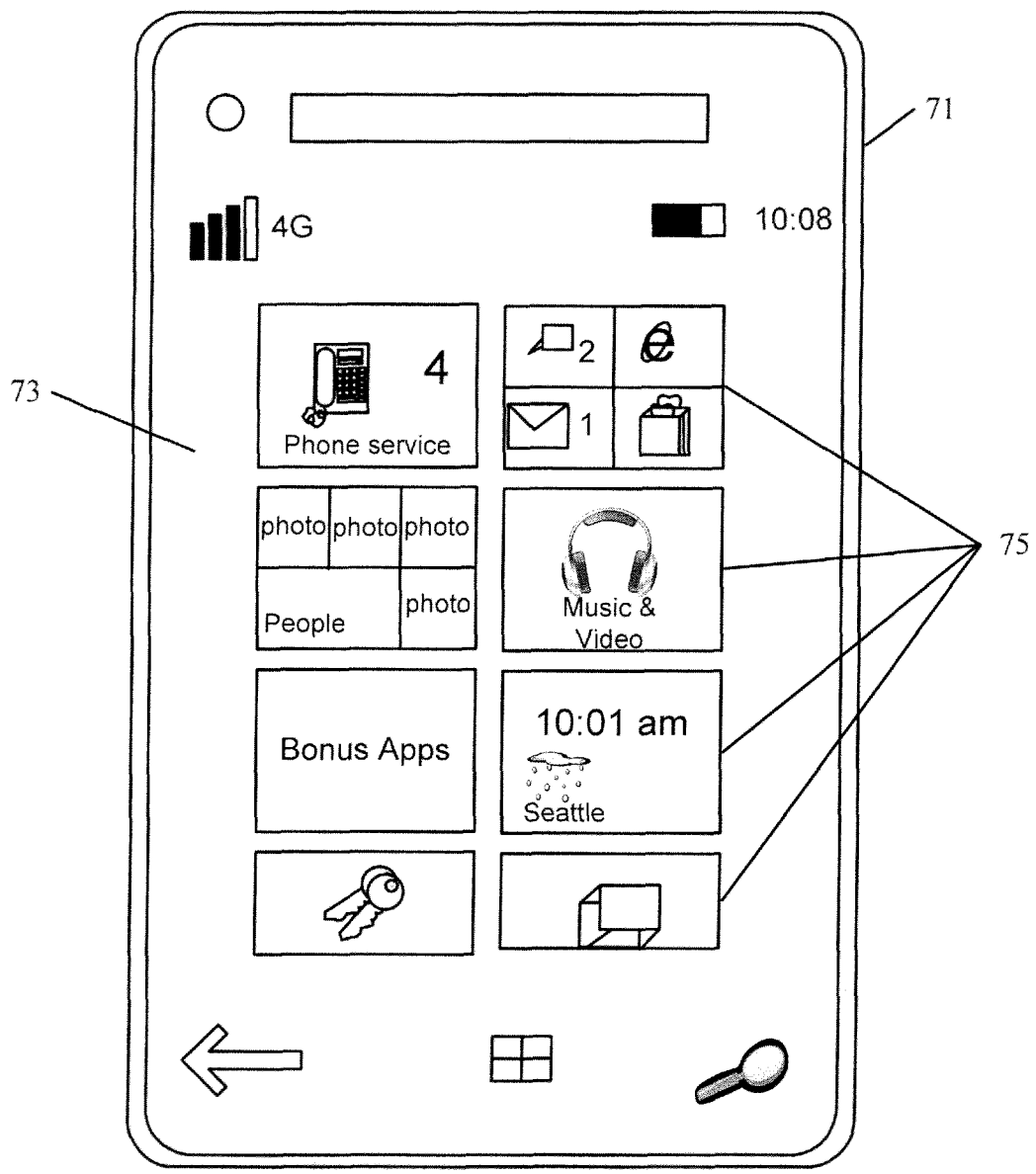

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody any of the processors shown in FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of client computing system 108. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
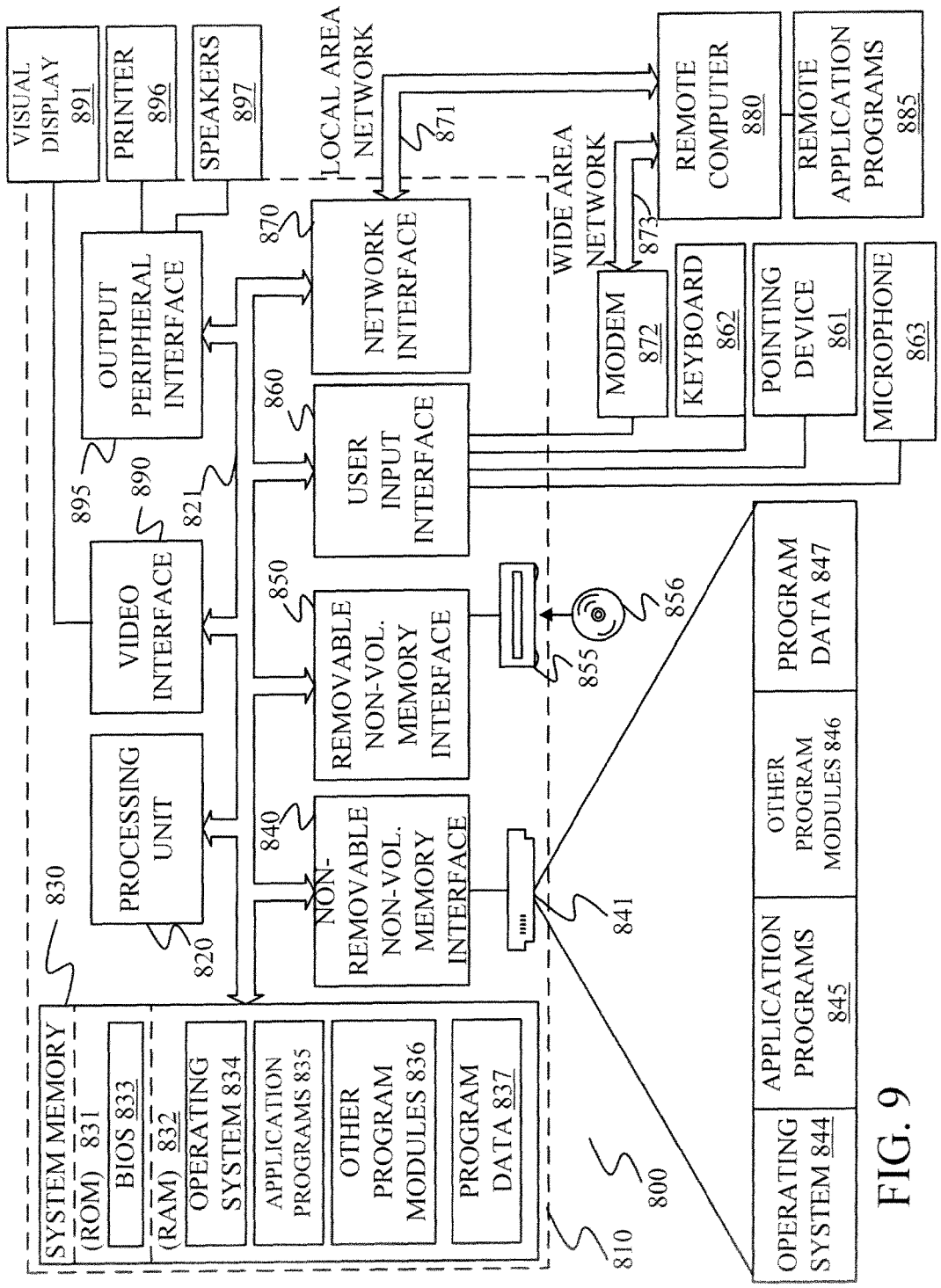
FIG. 9 is a block diagram of one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

application running logic that runs a plurality of applications;

issue identifying logic that accesses log data having log entries, each log entry being indicative of an event logged for one of the plurality of different applications, the issue detection logic detecting an issue, that inhibits operation of a given application of the plurality of different applications, based on the log data;

application identifier logic that identifies one of the plurality of different applications that is causing the issue;

state comparison logic that compares a current state of the identified application with a last known good state of the identified application and generates a comparison signal indicative of the comparison; and rollback control logic that, if it is determined that the issue is related to a change in state of the identified application based on the comparison signal, automatically controls the application running logic to run the identified application in the last known good state.

Example 2 is the computing system of any or all previous examples and further comprising:

rollback determination logic configured to determine whether the issue is related to a change in state of the identified application based on the comparison signal by identifying that the last known good state of the identified application is different from a current state of the identified application.

Example 3 is the computing system of any or all previous examples and further comprising:

application state logic configured to generate a state indicator indicative of a state of each of the plurality of different applications and state change information indicative of any state changes.

Example 4 is the computing system of any or all previous examples and further comprising:

running application detection logic configured to detect which applications are being run by the application running logic.

Example 5 is the computing system of any or all previous examples and further comprising:

user activity detection logic configured to detect user activity indicative of which, of the plurality of applications, the user interacts with.

Example 6 is the computing system of any or all previous examples and further comprising:

log data aggregation logic configured to, in response to the issue identifying logic identifying an issue, aggregate log entries corresponding to the issue; and service interaction logic configured to send the aggregated log entries to an assistance service.

Example 7 is the computing system of any or all previous examples wherein the service interaction logic sends the aggregated log entries to the assistance service along with a request for service health information about a hosting service that hosts the plurality of different applications.

Example 8 is the computing system of any or all previous examples and further comprising:

troubleshooter launching logic configured to, in response to the detection of the issue, launch troubleshooting logic that troubleshoots the plurality of different applications.

Example 9 is the computing system of any or all previous examples wherein the application identifier logic identifies the one of the plurality of applications as causing the issue based on the detected user activity corresponding to when the issue arose.

Example 10 is a computer implemented method, comprising:

running a plurality of different applications;

accessing log data having log entries, each log entry being indicative of an event logged for one of the plurality of different applications;

detecting an issue, that inhibits operation of a given application of the plurality of different applications, based on the log data;

identifying one of the plurality of different applications that is causing the issue;

comparing a current state of the identified application with a last known good state of the identified application;

generating a comparison signal indicative of the comparison; and if it is determined that the issue is related to a change in state of the identified application based on the comparison signal, automatically running the identified application in the last known good state.

Example 11 is the computer implemented method of any or all previous examples and further comprising:

detecting whether the issue is related to a change in state of the identified application based on the comparison signal by identifying that the last known good state of the identified application is different from a current state of the identified application.

Example 12 is the computer implemented method of any or all previous examples and further comprising:

generating a state indicator indicative of a state of each of the plurality of different applications and state change information indicative of any state changes.

Example 13 is the computer implemented method of any or all previous examples and further comprising:

detecting which applications are running.

Example 14 is the computer implemented method of any or all previous examples and further comprising:

detecting user activity indicative of which, of the plurality of different applications, the user interacts with.

Example 15 is the computer implemented method of any or all previous examples and further comprising:

in response to identifying an issue, aggregating log entries corresponding to the issue; and sending the aggregated log entries to an assistance service.

Example 16 is the computer implemented method of any or all previous examples wherein sending the aggregated log entries comprises:

sending the aggregated log entries to the assistance service along with a request for service health information about a hosting service that hosts the plurality of different applications.

Example 17 is the computer implemented method of any or all previous examples and further comprising:

in response to the detecting the issue, launching troubleshooting logic that troubleshoots the plurality of different applications.

Example 18 is the computer implemented method of any or all previous examples wherein identifying the application comprises:

identifying the one of the plurality of applications as causing the issue based on the detected user activity corresponding to when the issue arose.

Example 19 is a computing system, comprising:

application running logic that runs a plurality of different applications;

issue identifying logic that accesses log data having log entries, each log entry being indicative of an event logged for one of the plurality of different applications, the issue detection logic detecting an issue, that inhibits operation of a given application of the plurality of different applications, based on the log data;

application identifier logic that identifies one of the plurality of different applications that is causing the issue;

state comparison logic that compares a current state of the identified application with a last known good state of the identified application and generates a comparison signal indicative of the comparison;

rollback determination logic configured to determine whether the issue is related to a change in state of the identified application based on the comparison signal by identifying that the last known good state of the identified application is different from a current state of the identified application; and rollback control logic that, if it is determined that the issue is related to a change in state of the identified application based on the comparison signal, automatically controls the application running logic to run the identified application in the last known good state.

Example 20 is the computing system of any or all previous examples and further comprising:

application state logic configured to generate a state indicator indicative of a state of each of the plurality of different applications and state change information indicative of any state changes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   running application detection logic configured to detect a plurality of different applications that are being run concurrently by application running logic;
   issue identifying logic configured to:
      access log data having log entries, each log entry being indicative of an event logged for one of the plurality of different applications; and
      detect, based on the log data, an issue that inhibits operation of one or more of the plurality of different applications;
   user activity detection logic configured to detect user activity indicative of user interaction with the plurality of different applications that are being run concurrently by the application running logic;
   application identifier logic configured to:
      automatically identify a particular one of the plurality of different applications that is causing the issue based on the detected user activity corresponding to when the detected issue arose;
   state comparison logic configured to:
      compare a current state of the particular application with a last known good state of the particular application; and
      generate a comparison signal indicative of the comparison; and
   rollback control logic configured to:
      determine, based on the comparison signal, that the issue is related to a change in state of the particular application; and
      based on the determination, automatically control the application running logic to run the particular application in the last known good state.

2. The computing system of claim 1 and further comprising:
   rollback determination logic configured to determine whether the issue is related to a change in state of the particular application based on the comparison signal by identifying that the last known good state of the particular application is different from a current state of the particular application.

3. The computing system of claim 2 and further comprising:
   application state logic configured to generate a state indicator indicative of a state of each of the plurality of different applications and state change information indicative of any state changes.

4. The computing system of claim 3 and further comprising:
   troubleshooter launching logic configured to, in response to the detection of the issue, launch troubleshooting logic that troubleshoots the plurality of different applications.

5. The computing system of claim 2 and further comprising:
   log data aggregation logic configured to, in response to the issue identifying logic identifying an issue, aggregate log entries corresponding to the issue; and
   service interaction logic configured to send the aggregated log entries to an assistance service.

6. The computing system of claim 5 wherein the service interaction logic sends the aggregated log entries to the assistance service along with a request for service health information about a hosting service that hosts the plurality of different applications.

7. A computer implemented method, comprising:
   detecting a plurality of different applications that are being run concurrently by application running logic;
   accessing log data having log entries, each log entry being indicative of an event logged for one of the plurality of different applications;
   detecting an issue, that inhibits operation of one or more of the plurality of different applications, based on the log data;
   detecting user activity indicative of user interaction with the plurality of different applications that are being run concurrently;
   automatically identifying one of the plurality of different applications that is causing the issue based on the detected user activity corresponding to when the detected issue arose;
   comparing a current state of the identified application with a last known good state of the identified application;
   generating a comparison signal indicative of the comparison; and
   in response to a determination that the issue is related to a change in state of the identified application based on the comparison signal, automatically running the identified application in the last known good state.

8. The computer implemented method of claim 7 and further comprising:
   detecting whether the issue is related to a change in state of the identified application based on the comparison signal by identifying that the last known good state of the identified application is different from a current state of the identified application.

9. The computer implemented method of claim 8 and further comprising:
   generating a state indicator indicative of a state of each of the plurality of different applications and state change information indicative of any state changes.

10. The computer implemented method of claim 9 and further comprising:
    detecting which applications are running.

11. The computer implemented method of claim 9 and further comprising:
    in response to the detecting the issue, launching troubleshooting logic that troubleshoots the plurality of different applications.

12. The computer implemented method of claim 8 and further comprising:
    in response to identifying an issue, aggregating log entries corresponding to the issue; and
    sending the aggregated log entries to an assistance service.

13. The computer implemented method of claim 12 wherein sending the aggregated log entries comprises:
    sending the aggregated log entries to the assistance service along with a request for service health information about a hosting service that hosts the plurality of different applications.

14. A computing system, comprising:
    at least one processor; and
    memory storing instructions executable by the at least one processor, wherein the instructions, when executed, configure to the computing system to:
       detect a plurality of different applications that are being run concurrently;
       access log data having log entries, each log entry being indicative of an event logged for one of the plurality of different applications;

detect an issue, that inhibits operation of one or more of the plurality of different applications, based on the log data;

detect user activity indicative of user interaction with the plurality of different applications that are being run concurrently by the application running logic;

identify one of the plurality of different applications that is causing the issue based on the detected user activity corresponding to when the detected issue arose;

compare a current state of the identified application with a last known good state of the identified application and generate a comparison signal indicative of the comparison;

determine that the issue is related to a change in state of the identified application based on the comparison signal by identifying that the last known good state of the identified application is different from a current state of the identified application; and in response to a determination that the issue is related to a change in state of the identified application based on the comparison signal, automatically run the identified application in the last known good state.

15. The computing system of claim 14 wherein the instructions, when executed, configure to the computing system to:

generate a state indicator indicative of a state of each of the plurality of different applications and state change information indicative of any state changes.

* * * * *